United States Patent
Yang

(10) Patent No.: US 10,312,556 B2
(45) Date of Patent: Jun. 4, 2019

(54) BATTERY MODULE

(71) Applicant: SAMSUNG SDI CO., LTD., Yongin-si, Gyeonggi-do (KR)

(72) Inventor: Seungwoo Yang, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 87 days.

(21) Appl. No.: 15/296,076

(22) Filed: Oct. 18, 2016

(65) Prior Publication Data

US 2017/0244138 A1     Aug. 24, 2017

(30) Foreign Application Priority Data

Feb. 24, 2016   (KR) .......................... 10-2016-0021870

(51) Int. Cl.
| | | |
|---|---|---|
| *H01M 10/48* | (2006.01) | |
| *H01M 2/20* | (2006.01) | |
| *H01M 10/42* | (2006.01) | |

(52) U.S. Cl.
CPC ......... *H01M 10/486* (2013.01); *H01M 2/202* (2013.01); *H01M 10/425* (2013.01); *H01M 10/482* (2013.01); *H01M 2010/4271* (2013.01); *H01M 2010/4278* (2013.01); *H01M 2220/20* (2013.01); *H01M 2220/30* (2013.01)

(58) Field of Classification Search
CPC .. H01M 10/425; H01M 10/486; H01M 2/202; H01M 2010/4278; H01M 2220/20; H01M 2220/30; G05D 23/00; G05D 23/1917; G05D 23/1927; G05D 23/1931; H05K 1/00; H05K 1/0201
See application file for complete search history.

(56) References Cited

U.S. PATENT DOCUMENTS

2012/0148876 A1   6/2012   Zeng et al.

FOREIGN PATENT DOCUMENTS

| DE | 10 2011 004 353 A1 | 8/2012 | | |
|---|---|---|---|---|
| EP | 1 940 003 A2 | 2/2008 | | |
| JP | 2004-179085 A | 6/2004 | | |
| JP | 2006-112944 | * 4/2006 | ............... | G01K 7/00 |
| JP | 2014 026752 A | 2/2014 | | |
| KR | 10-2009-0006565 A | 1/2009 | | |
| KR | 10-2014-0027079 A | 3/2014 | | |
| WO | WO 2012-075948 | * 6/2012 | ............... | H02J 7/00 |

OTHER PUBLICATIONS

Extended European Search Report dated Jul. 5, 2017 of the European Patent Application No. 16207526.1.

* cited by examiner

*Primary Examiner* — Raymond Alejandro
(74) *Attorney, Agent, or Firm* — Lee & Morse, P.C.

(57) ABSTRACT

A battery module includes a circuit board, bus bars, a first temperature sensor, a second temperatures sensor, and a controller. The circuit board is over a plurality of battery cells. The bus bars are connected to the battery cells and the circuit board. The first temperature sensor is on the circuit board to measure a first temperature of the battery cells. The second temperature sensor is on the circuit board and spaced from the first temperature sensor. The second temperature sensor measures a second temperature from the circuit board. The controller is on the circuit board, receive information indicative of the first temperature and the second temperature, and calculates an estimated temperature of each of the battery cells.

9 Claims, 5 Drawing Sheets

131  132

131  132

BATTERY MODULE

CROSS-REFERENCE TO RELATED APPLICATION

Korean Patent Application No. 10-2016-0021870, filed on Feb. 24, 2016, and entitled, "Battery Module," is incorporated by reference herein in its entirety.

BACKGROUND

1. Field

One or more embodiments described herein relate to a battery module.

2. Description of the Related Art

Mobile devices, electric vehicles, hybrid vehicles, and other electronic equipment are powered by battery cells. When long-time or high-power driving is used to operate electronic equipment (e.g., electric or hybrid vehicles) that consumes a large amount of power, a plurality of battery cells may be electrically connected in a battery module to meet output and capacity requirements. In order to output a predetermined voltage, the battery module may be controlled according to temperature changes.

To accurately measure temperature, a plurality of temperature sensors may be directly installed on the battery cells. However, separate structures and adhesives for directly installing the temperature sensors on the battery cells are used. Additional structures for connecting the temperature sensors to a protective circuit module are also used. Accordingly, manufacturing costs of the battery module may be excessively high.

SUMMARY

In accordance with one or more embodiments, a battery module includes a circuit board on a plurality of battery cells; bus bars electrically connecting the battery cells and electrically connected to the circuit board; a first temperature sensor on the circuit board to measure a first temperature of the battery cells; a second temperature sensor on the circuit board and spaced from the first temperature sensor, the second temperature sensor to measure a second temperature from the circuit board; and a controller on the circuit board to receive information indicative of the first temperature and the second temperature and to calculate an estimated temperature of each of the battery cells.

The first temperature sensor may be adjacent and electrically connected to the bus bars through a circuit pattern of the circuit board. The first temperature sensor may be on a top surface of the circuit board, and a throughhole penetrating the top surface and a bottom surface of the circuit board may be under the first temperature sensor of the circuit board. The second temperature sensor may be spaced by a greater amount from the bus bars than the first temperature sensor, and the second temperature sensor may be at a region to detect a temperature change substantially equal to a temperature change detected by the first temperature sensor.

One or more electric devices of the circuit board, which are not electrically connected to the first temperature sensor, and a circuit pattern may be spaced at least 5 mm from the first temperature sensor. The controller may calculate the estimated temperature of each battery cell by subtracting from the first temperature a value obtained by multiplying a temperature difference between the first temperature and the second temperature with a correction coefficient. The correction coefficient may be stored in a lookup table based on temperature difference. The correction coefficient may set to 0 when the temperature difference is a negative value and is increased by a value set from the temperature difference as the temperature difference is increased.

The first temperature sensor and the second temperature sensor may be installed at regions of the circuit board, where smaller thermal influences are exerted in balancing voltages of the battery cells or controlling charge/discharge states of the battery cells.

In accordance with one or more other embodiments, an apparatus includes a first temperature sensor; a second temperature sensor; a circuit board adjacent to one or more battery cells; and a controller to calculate a temperature of the one or more battery cells based on signals output from the first and second temperature sensors, wherein the first temperature sensor is closer to the one or more battery cells than the second temperature sensor and the second temperature sensor is closer to at least one circuit of the circuit board than the second battery cell The controller may calculate the temperature of the one or more battery cells by offsetting a temperature of the at least one circuit of the circuit board detected by the second temperature sensor. The controller may calculate the temperature of the one or more battery cells based on a correction value. The correction value may change with a difference between the temperatures from the first and second temperature sensors. The correction value may be based on a comparative accumulation of actually measured temperatures of the one or more battery cells and a calculated temperature of the one or more battery cells. The correction value may match a design of the circuit board.

In accordance with one or more other embodiments, a controller includes a first connection to a first temperature sensor; a second connection to a second temperature sensor, and logic to calculate a temperature of one or more battery cells based on signals output from the first and second temperature sensors through the first and second connections respectively, wherein the first temperature sensor is closer to the one or more battery cells than the second temperature sensor and the second temperature sensor is closer to at least one circuit of the circuit board than the second battery cell.

BRIEF DESCRIPTION OF THE DRAWINGS

Features will become apparent to those of skill in the art by describing in detail exemplary embodiments with reference to the attached drawings in which.

DETAILED DESCRIPTION

Figure 1A:
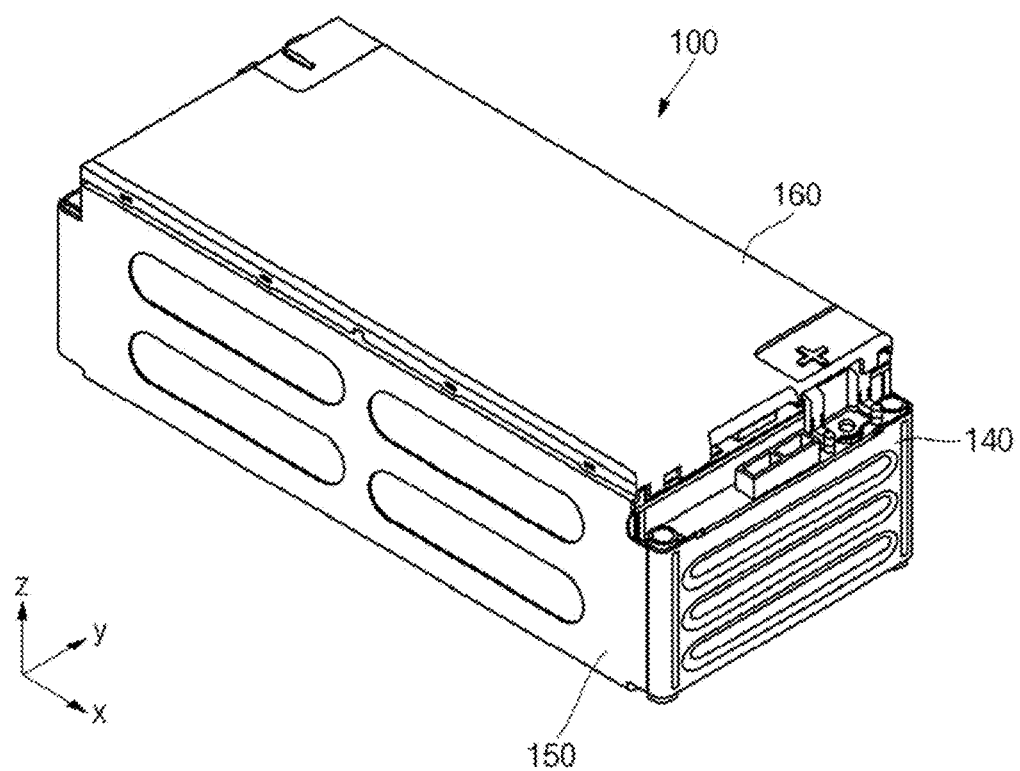
FIGS. 1A to 1C illustrate an embodiment of a battery module.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In the drawings, the thickness of layers and regions are exaggerated for clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B, or an intervening element C may be present between the elements A and B so that the element A can be indirectly connected to the element B.

In addition, the terminology used herein is for the purpose of describing particular embodiments only and is not intended to be limiting thereof. As used herein, the singular forms are intended to include the plural forms as well, unless the context clearly indicates otherwise. It will be further understood that the terms "comprises" or "include" and/or "comprising" or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer and/or a first section discussed below could be termed a second member, a second element, a second region, a second layer and/or a second section without departing from the teachings.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

In addition, the term "separator" used herein includes a separator commonly used for a liquid electrolyte battery using a liquid electrolyte having little affinity to the separator. Further, the term "separator" used herein includes an intrinsic solid polymer electrolyte and/or a gel solid polymer electrolyte, in which an electrolyte is firmly bound to a separator, so that the electrolyte and the separator should be interpreted as being identical with each other. Therefore, the meaning of the separator should be defined as having a meaning that is consistent with its meaning in the context of the present disclosure.

Figure 1B:
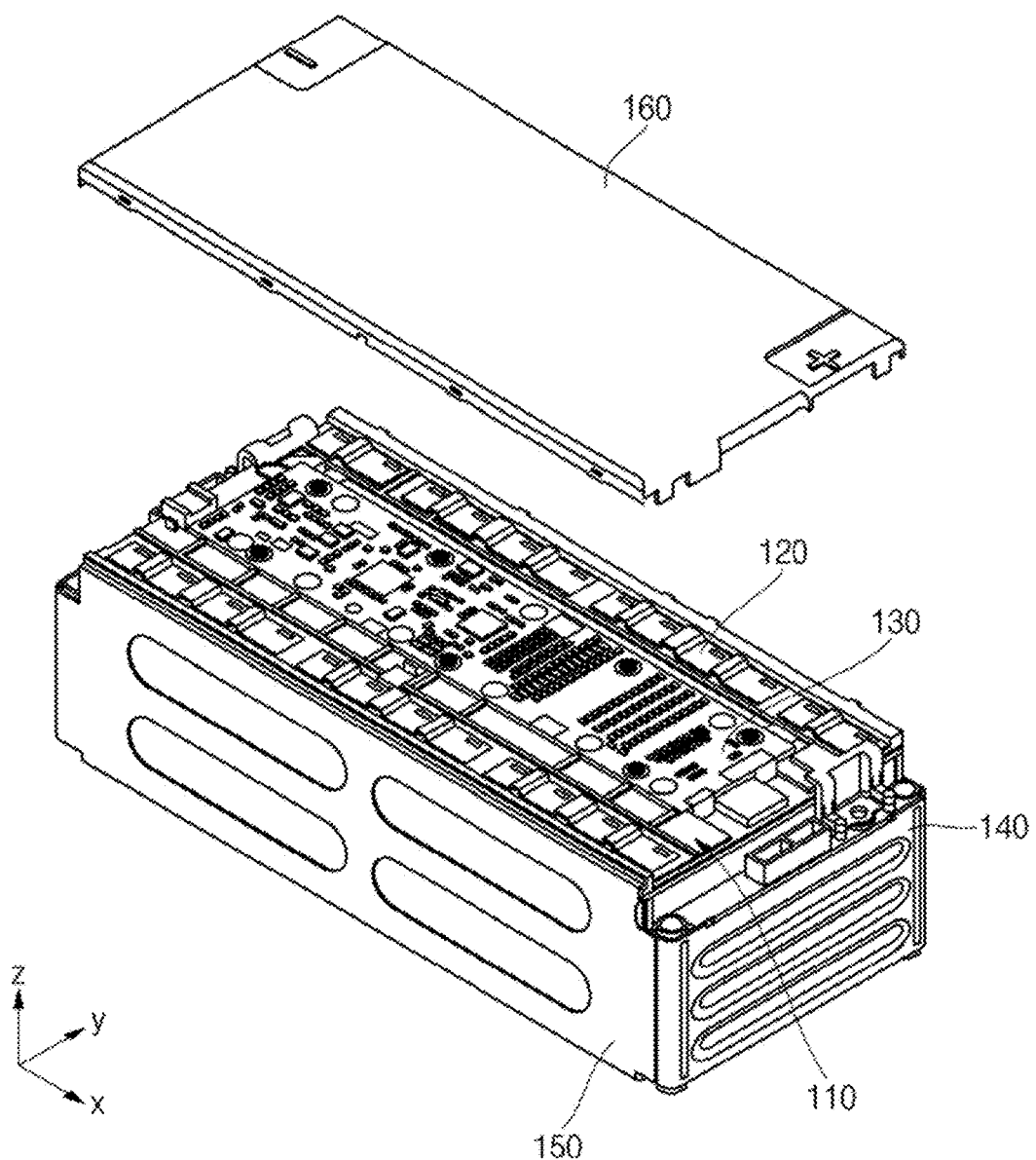
Figure 1C:
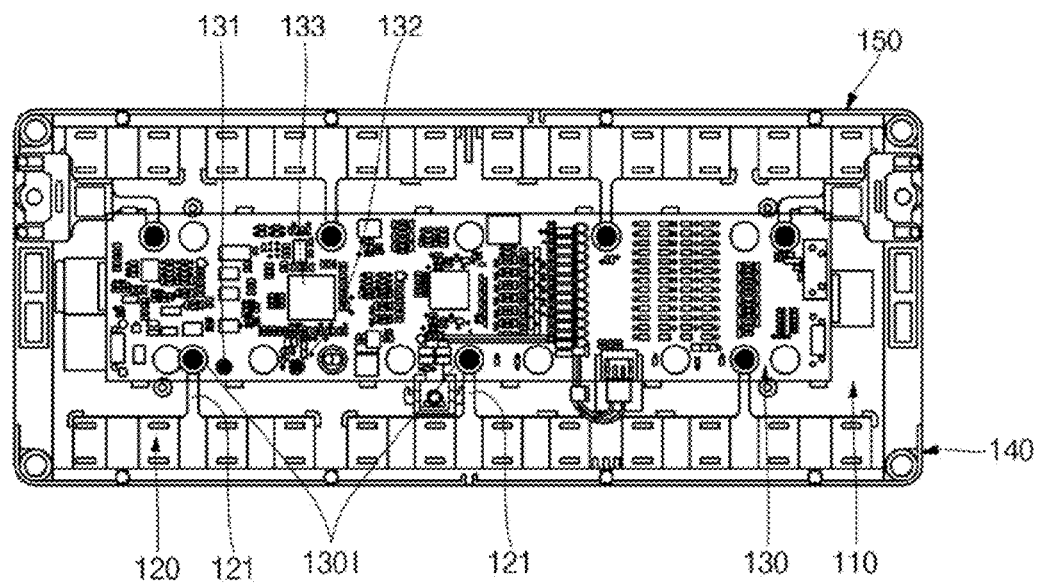

FIG. 1A illustrates a perspective view of an embodiment of a battery module 100. FIG. 1B illustrates an exploded perspective view of a top cover of the battery module 100. FIG. 1C illustrates an exploded plan view of the top cover of the battery module 100.

Referring to FIGS. 1A to 1C, the battery module 100 may include a plurality of battery cells, an inner cover 110, bus bars 120, a circuit board 130, end plates 140, side plates 150, and a top or upper cover 160.

The battery cells generate energy from the battery cells, which, for example, may be arranged in a first direction (x). Each battery cell may include a case having a top opening and an electrode assembly. The case includes an electrolyte. The electrode assembly and the electrolyte may electrochemically react with each other to generate energy. The top opening of the case may be sealed by a cap assembly. In addition, electrode terminals having different polarities (i.e., positive and negative electrode terminals) may be in the cap assembly on top surfaces of the battery cells.

The inner cover 110 is on the battery cells. A plurality of bus bars 120 electrically connect the battery cells to one another and are mounted on the inner cover 110. The inner cover 110 may have a size sufficient to entirely cover the top surfaces of the battery cells. In addition, the inner cover 110 may include a plurality of holes for upwardly exposing the electrode terminals of the battery cells. The inner cover 110 is preferably made of an insulating material.

The bus bars 120 may connect the battery cells to one another, in series or parallel, by connecting the electrode terminals of neighboring battery cells. The bus bars 120 are brought into contact with and connected to the electrode terminals of the upwardly exposed battery cells through the inner cover 110 and are supported by the inner cover 110. The bus bars 120 electrically connect the electrode terminals of the battery cells arranged in the first direction (x) to one another. For example, the bus bars 120 may be arranged in the first direction (x) and spaced apart from each other at opposite sides on the inner cover 110. The bus bars 120 may include circuit board connection parts 121 protruding toward the circuit board 130. The circuit board connection parts 121 are coupled to the circuit board 130 and electrically connected.

The circuit board 130 is fastened with a top portion of the inner cover 110 and includes one or more devices for controlling and monitoring charge/discharge states of the battery cells. The circuit board 130 may be fastened with the center of the top portion of the inner cover 110, so as to be spaced apart from the bus bars 120. For example, the circuit board 130 is mounted at the center of the first direction (x) on the inner cover 110. The bus bars 120 electrically connecting the battery cells in the first direction (x) are mounted at opposite sides of the circuit board 130.

In addition, the circuit board 130 may be electrically connected to the bus bars 120. The bus bars 120 may be electrically connected to input/output terminals 130I on a bottom surface of the circuit board 130. For example, the circuit board connection parts 121 of the bus bars 120 may be connected to the input/output terminals 130I on the bottom surface of the circuit board 130.

In order to accurately estimate temperatures of the battery cells, the circuit board 130 includes a plurality of temperature sensors 131 and 132. In addition, the temperature sensors 131 and 132 may be electrically connected to a controller 133 mounted on the circuit board 130. The controller 133 estimates the temperatures of the battery cells.

The first temperature sensor 131 measures the temperatures of the battery cells. The second temperature sensor 132 eliminates influences caused by a change in the temperature of the circuit board 130 based on a first temperature measured by the first temperature sensor 131. For example, the first temperature sensor 131 may be a sensor for measuring the temperatures of the battery cells, and the second temperature sensor 132 may be a sensor for measuring the temperature of the circuit board 130.

Figure 2A:
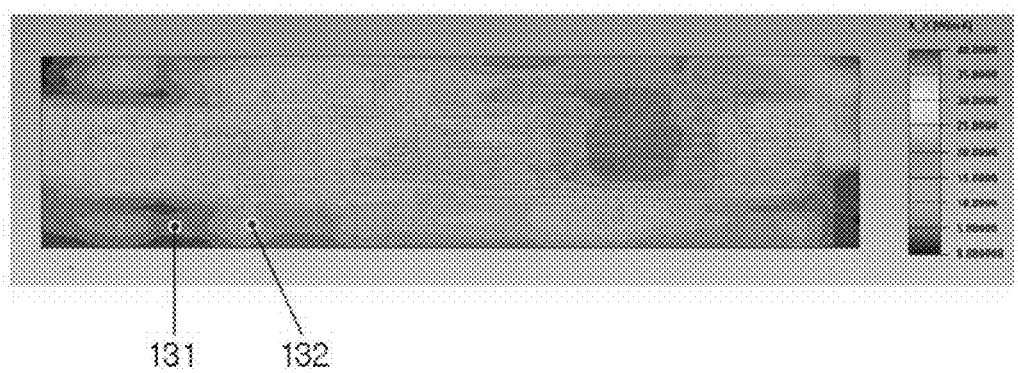
FIGS. 2A and 2B illustrate an example of simulated and experimental results for temperatures changes of a circuit board in the battery module.
Figure 2B:
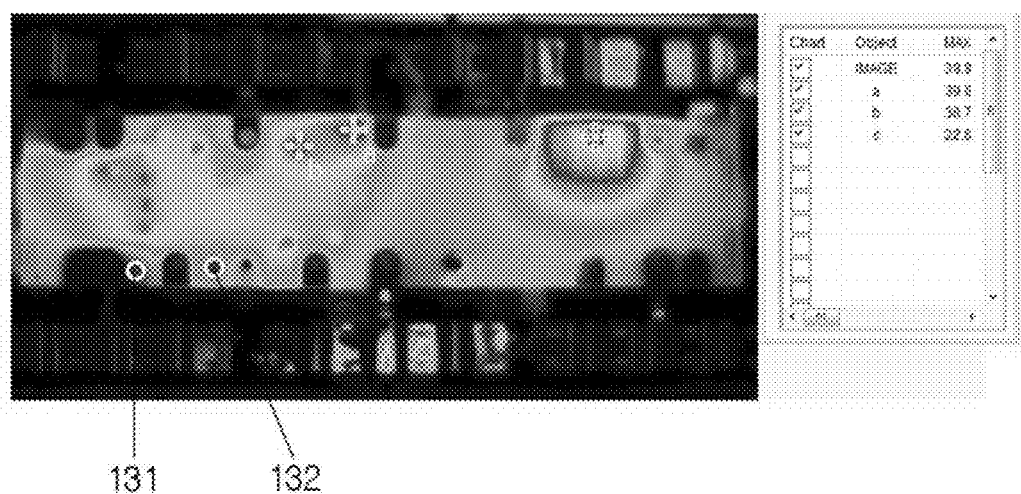

FIG. 2A illustrates an example of simulated results of the first temperature sensor 131 and the second temperature sensor 132 for a change in the temperature of the battery module 100. FIG. 2B illustrates an example of experimental results of the temperature of the circuit board 130 measured during actual charging and discharging operations of the battery module 100. The simulated and experimental results are repeatedly and cumulatively identified, thereby setting positions of the first temperature sensor 131 and the second temperature sensor 132 to regions where relatively small change in temperature occurs.

The first temperature sensor 131 may not be influenced by temperatures of various electric devices of the circuit board 130 and a circuit pattern, and may be installed at a region that is influenced (at least predominantly) by temperatures of the battery cells. The first temperature sensor 131 may be installed on a top surface of the circuit board 130. The electric devices of the circuit board 130 and the circuit pattern may not be provided, for example, within at least 5 mm around the first temperature sensor 131. However, a circuit pattern for electrically connecting the first temperature sensor 131 to another electric device may be provided. For example, the electric devices and the circuit pattern, other than a circuit pattern for connecting the first temperature sensor 131 and the controller 133 and a circuit pattern for electrically connecting the first temperature sensor 131 and the input/output terminals 130I, may not be provided within at least 5 mm around the first temperature sensor 131. The spacing distance may be different from 5 mm in another embodiment.

The second temperature sensor 132 may be installed at a region of the circuit board 130 where a smaller thermal influence is exerted in balancing voltages of the battery cells or controlling charge/discharge states of the battery cells. The first temperature sensor 131 and the second temperature sensor 132 may be installed at regions of the circuit board 130 where an electric device for controlling charge/discharge states of the battery cells and the circuit pattern are not provided.

Figure 3:
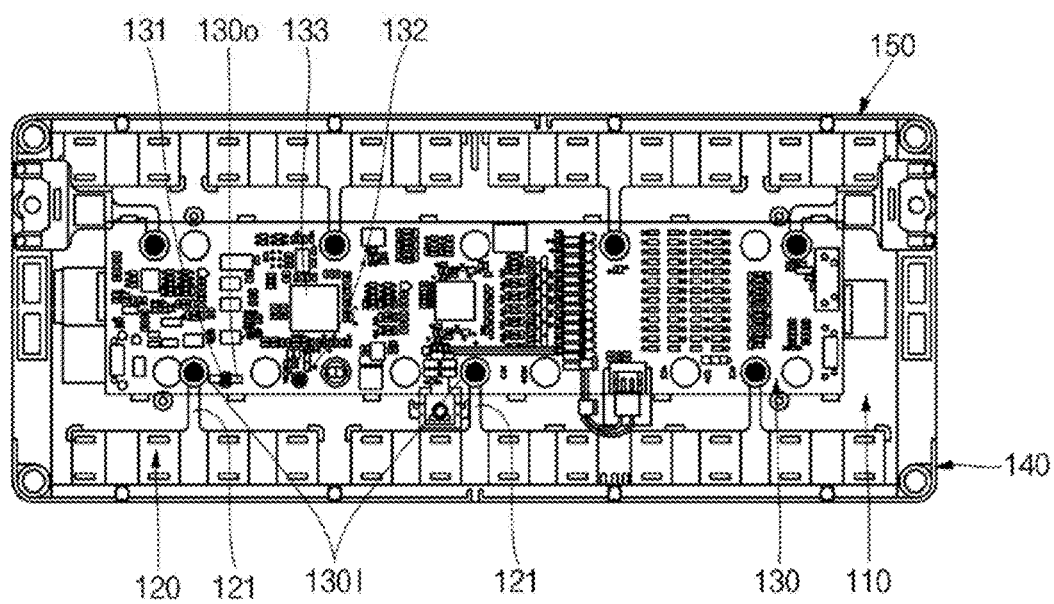
FIG. 3 illustrates an embodiment of a top cover in a battery module.

For example, the first temperature sensor 131 may be installed in the vicinity of the input/output terminals 130I of the circuit board 130, so as to be adjacent to the bus bars 120. The first temperature sensor 131 may be electrically connected to the circuit board connection parts 121 of the bus bars 120 through the circuit pattern of the circuit board 130, so that the first temperature sensor 131 is influenced to a greater extent by the change in temperatures of the battery cells. In addition, as illustrated in FIG. 3, a throughhole 130o penetrating the top surface and the bottom surface of the circuit board 130 may be in the circuit board 130 having the first temperature sensor 131 installed therein, so that the throughhole 130o is influenced to a greater extent by the temperatures of the battery cells.

In one embodiment, the second temperature sensor 132 is spaced from the bus bars 120 to a greater extent than the first temperature sensor 131 and demonstrates a similar temperature change to the region where the first temperature sensor 131 is installed. The second temperature sensor 132 may be installed at a region of the circuit board 130 where a relatively small thermal influence is exerted in balancing voltages of the battery cells or controlling the charge/discharge states of the battery cells. The first temperature sensor 131 and the second temperature sensor 132 may be installed at the same position of the battery module 100, in the case where the same circuit board is employed for the first temperature sensor 131 and the second temperature sensor 132 in circuit board.

As described above, the first and second temperatures measured by the first and second temperature sensors 131 and 132 on the circuit board 130 are applied to the controller 133 mounted on the circuit board 130. The controller 133 may calculate an estimated temperature Tb of each of the battery cells, for example, by Equation 1:

$$T_b = T_1 - (T_2 - T_1) \times A \quad (1)$$

where T1 is a first temperature corresponding to the temperature of each battery cell measured by the first temperature sensor 131, T2 is a second temperature corresponding to the temperature of the circuit board 130 measured by the second temperature sensor 132, and A is a correction coefficient. Thus, the controller 133 may calculate the estimated temperature Tb of each battery cell by eliminating the influence of the temperature of the circuit board 130 from the first temperature T1 as measured by the first temperature sensor 131.

The correction coefficient A may be set differently from a temperature difference T21 between the second temperature T2 and the first temperature T1. The correction coefficient A for the temperature difference T21 may be set by comparatively accumulating actually measured temperatures of the battery cells and the estimated temperature Tb of each of the battery cells, as measured by the first temperature sensor 131 and the second temperature sensor 132 on the circuit board 130.

In addition, the correction coefficient A for the temperature difference T21 may be set differently according to the design of the circuit board 130 and may be stored in the controller 133, for example, in the form of a lookup table. In one embodiment, the same correction coefficient may be set to the battery module 100 when the same circuit board is employed for the first temperature sensor 131 and the second temperature sensor 132 installed at the same position in circuit board.

For example, the correction coefficient A may be set to 0 when the temperature difference T21 is a negative value. The correction coefficient A may be set to 0.45 when the temperature difference T21 is equal to or greater than 0 and smaller than 3. When the temperature difference T21 is equal to or greater than 3 and smaller than 5, the correction coefficient A may be set to 0.8. For example, when the first temperature T1 is higher than the second temperature T2, the controller 133 outputs the first temperature T1 as the estimated temperature Tb of each battery cell. When the second temperature T2 is equal to or higher than the first temperature T1, the controller 133 outputs the estimated temperature Tb of each battery cell by subtracting the temperature difference T21 for the correction coefficient A from the first temperature T1. In addition, the correction coefficient A may be increased by the value set from the temperature difference T21.

As described above, the controller 133 may obtain the estimated temperature Tb of each battery cell based on the first temperature T1 and the second temperature T2 measured by the first temperature sensor 131 and the second temperature sensor 132 on the circuit board 130.

End plates 140 are at opposite ends of facing battery cells among the plurality of battery cells arranged in a predetermined direction. Side plates 150 may be coupled to a pair of end plates 140 to cover short side surfaces of the battery cells. For example, the battery cells may be arranged in a first direction in a spaced defined by the pair of end plates 140 and the pair of side plates 150.

The upper cover 160 may be coupled to the end plates 140 and the side plates 150, to thereby protect the bus bars 120 and the circuit board 130 from external circumstances. The upper cover 160 may be made of an insulating material.

In accordance with another embodiment, a controller includes a first connection to a first temperature sensor, a second connection to a second temperature sensor, and logic to calculate a temperature of one or more battery cells based on signals output from the first and second temperature sensors through the first and second connections respectively, wherein the first temperature sensor is closer to the one or more battery cells than the second temperature sensor and the second temperature sensor is closer to at least one circuit of the circuit board than the first temperature sensor. The controller may be any of the aforementioned embodiments which include a controller.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers and other processing features of the disclosed embodiments may be implemented in logic which, for example, may include hardware, software, or both. When implemented at least partially in hardware, the controllers and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed, and although specific terms are employed they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the embodiments set forth in the claims.

What is claimed is:

1. A battery module, comprising:
a circuit board on a plurality of battery cells;
bus bars electrically connecting the plurality of battery cells and electrically connected to the circuit board through a plurality of single input/output terminals on the circuit board;
a first temperature sensor on the circuit board to measure a first temperature corresponding to the plurality of battery cells, the first temperature sensor being spaced apart from the bus bars and adjacent a first single input/output terminal of the plurality of single input/output terminals on the circuit board;
a second temperature sensor on the circuit board and spaced apart from the first temperature sensor, the second temperature sensor to measure a second temperature from the circuit board, the second temperature sensor being further from the first single input/output terminal than the first temperature sensor; and
a controller on the circuit board to receive information indicative of the first temperature and the second temperature and to calculate an estimated temperature of the plurality of battery cells, wherein
the first temperature sensor is electrically connected to the first single input/output terminal through a circuit pattern of the circuit board,
the first temperature sensor is on a top surface of the circuit board facing away from the plurality of battery cells,
a throughhole penetrating the top surface and a bottom surface of the circuit board is under the first temperature sensor of the circuit board, and
the second temperature sensor is on the top surface of the circuit board, and the bottom surface of the circuit board is between the second temperature sensor and the plurality of battery cells.

2. The battery module as claimed in claim 1, wherein one or more electric devices of the circuit board, which are not electrically connected to the first temperature sensor, are spaced at least 5 mm from the first temperature sensor.

3. The battery module as claimed in claim 1, wherein the controller is to calculate the estimated temperature of each of the battery cells by subtracting from the first temperature a value obtained by multiplying a temperature difference between the first temperature and the second temperature with a correction coefficient.

4. The battery module as claimed in claim 3, wherein the correction coefficient is to be stored in a lookup table based on temperature difference.

5. The battery module as claimed in claim 3, wherein the correction coefficient is to be set to 0 when the temperature difference is a negative value and is increased by a value set from the temperature difference as the temperature difference is increased.

6. The battery module as claimed in claim 1, wherein the first temperature sensor and the second temperature sensor are installed at regions of the circuit board spaced from an electric device on the circuit board for controlling charge/discharge states of the plurality of battery cells.

7. The battery module as claimed in claim 6, wherein the second temperature sensor is closer to the electric device than the first temperature sensor.

8. The battery module as claimed in claim 1, wherein the first temperature sensor is between the first single input/output terminal and the second temperature sensor.

9. The battery module as claimed in claim 1, wherein the second temperature sensor is closer to at least one circuit of the circuit board than the first temperature sensor is to any circuit of the circuit board.

\* \* \* \* \*